(12) United States Patent
Timperi et al.

(10) Patent No.: US 9,945,423 B2
(45) Date of Patent: Apr. 17, 2018

(54) METHOD AND APPARATUS RELATING TO MOVABLE ASSEMBLY

(75) Inventors: Mikko Juhani Timperi, Raisio, FL (US); Tommi Antero Teuri, Teijo, FL (US)

(73) Assignee: Provenance Asset Group LLC, Essex, CT (US)

( * ) Notice: Subject to any disclaimer, the term of this patent is extended or adjusted under 35 U.S.C. 154(b) by 1525 days.

(21) Appl. No.: 12/650,284

(22) Filed: Dec. 30, 2009

(65) Prior Publication Data

US 2011/0158566 A1    Jun. 30, 2011

(51) Int. Cl.
*F16C 43/02* (2006.01)
*F16C 29/02* (2006.01)
*H04M 1/02* (2006.01)

(52) U.S. Cl.
CPC .............. *F16C 43/02* (2013.01); *F16C 29/02* (2013.01); *H04M 1/0237* (2013.01); *Y10T 29/49641* (2015.01)

(58) Field of Classification Search
CPC ... B21J 9/025; B21J 9/08; F16C 43/02; F16C 29/02; Y10T 29/49641; H04M 1/0237
USPC .................. 16/334; 361/679.39; 379/428.01, 379/433.01, 433.12; 455/575.1, 575.4
See application file for complete search history.

(56) References Cited

U.S. PATENT DOCUMENTS

| | | | | |
|---|---|---|---|---|
| 3,458,618 A | * | 7/1969 | Burns et al. | 264/249 |
| 4,767,298 A | * | 8/1988 | Bocchicchio et al. | 425/112 |
| 4,912,602 A | * | 3/1990 | Zurek et al. | 361/752 |
| 4,986,674 A | * | 1/1991 | Decker et al. | 384/10 |
| 5,095,606 A | * | 3/1992 | Barrick | 29/509 |
| 5,227,173 A | * | 7/1993 | Sherwood | 425/143 |
| 6,099,291 A | * | 8/2000 | Lanser | 425/508 |
| 2007/0006421 A1 | * | 1/2007 | Park et al. | 16/334 |
| 2008/0045281 A1 | | 2/2008 | Huang et al. | |
| 2009/0211057 A1 | | 8/2009 | Yamaguchi | |

FOREIGN PATENT DOCUMENTS

| | | |
|---|---|---|
| CN | 1893460 A | 1/2007 |
| DE | 102007059463 A1 | 6/2009 |
| EP | 1867058 A1 | 12/2007 |
| EP | 1970793 A1 | 9/2008 |
| GB | 2448786 B | 6/2009 |
| JP | 2006050204 A | 2/2006 |
| JP | 2007180667 A | 7/2007 |
| JP | 2008034967 A | 2/2008 |

(Continued)

OTHER PUBLICATIONS

International Search Report and Written Opinion received in corresponding Patent Cooperation Treaty Application No. PCT/FI2010/050818, dated Feb. 23, 2011, 13 pages.

(Continued)

*Primary Examiner* — Jacob Cigna
(74) *Attorney, Agent, or Firm* — Dinsmore & Shohl LLP

(57) ABSTRACT

In accordance with an example embodiment of the present invention, a method for providing a slide arrangement is provided, comprising: coupling a first rail part with a second rail part; deforming at least one of the first rail part and the second rail part for reducing a separation distance between the first rail part and the second rail part; and configuring the first rail part and the second rail part for relative movement.

14 Claims, 9 Drawing Sheets

(56) References Cited

FOREIGN PATENT DOCUMENTS

| | | |
|---|---|---|
| JP | 2009 089253 A | 4/2009 |
| JP | 2009206587 A | 9/2009 |
| WO | 2006098590 A1 | 9/2006 |
| WO | 2006107129 A1 | 10/2006 |
| WO | 2008041793 A1 | 4/2008 |
| WO | 2009002103 A2 | 12/2008 |

OTHER PUBLICATIONS

Office Action for Chinese Application No. 201080060298.5 dated Apr. 1, 2014.

\* cited by examiner coupling a first rail part with a second rail part deforming at least one of the first rail part and the second rail part for reducing a separation distance between the first rail part and the second rail part configuring the first rail part and the second rail part for relative movement

METHOD AND APPARATUS RELATING TO MOVABLE ASSEMBLY

TECHNICAL FIELD

The present application relates generally to movable assemblies and methods of their manufacture.

BACKGROUND

Movable assemblies are common in many mechanical apparatuses. For example in electronics devices, form factors involving movable body parts are popular. Such form factors may take advantage of sliding, rotational, tilting, swiveling, telescopic, or other type of movement, or a combination of them. The general advantage of such form factors is their ability to provide different operating positions for different situations. For example a device may be configured to provide a compact position in which a device is convenient to store, or use with basic functionalities, and an extended position in which additional user interface capabilities are exposed and accessible to the user.

SUMMARY

Various aspects of examples of the invention are set out in the claims.

According to a first aspect of the present invention, a method for providing a slide arrangement is provided, comprising: coupling a first rail part with a second rail part; deforming at least one of the first rail part and the second rail part for reducing a separation distance between the first rail part and the second rail part; and configuring the first rail part and the second rail part for relative movement.

According to a second aspect of the present invention, an apparatus is provided, comprising: a first rail part and a second rail part; the first rail part and the second rail part movably coupled with each other and having a separation distance; at least one of the first rail part and the second rail part being configured for deformation wherein said deformation reduces the separation distance.

BRIEF DESCRIPTION OF THE DRAWINGS

For a more complete understanding of example embodiments of the present invention, reference is now made to the following descriptions taken in connection with the accompanying drawings in which.

DETAILED DESCRIPTON OF THE DRAWINGS

An example embodiment of the present invention and its potential advantages are understood by referring to FIGS. 1 through 13 of the drawings.

Figures 1A, 1B:
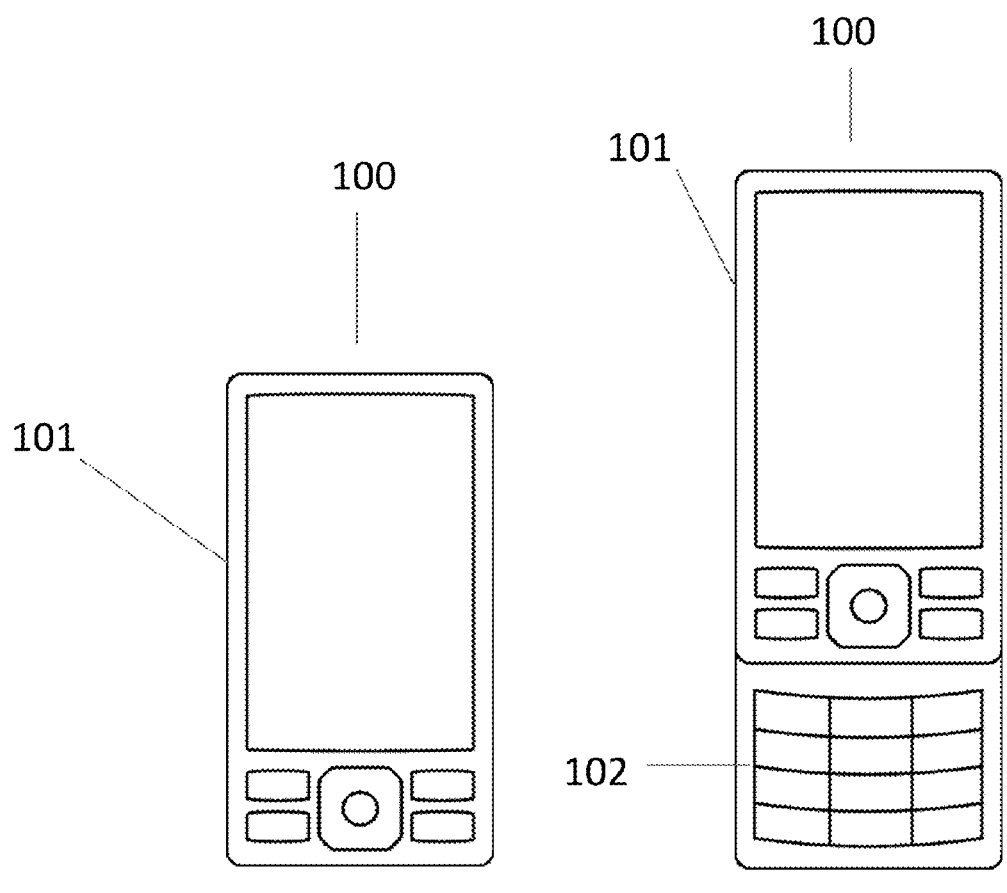
FIG. 1a is an overall view of an apparatus comprising aspects of the invention, the apparatus shown in a first position.
FIG. 1b is an overall view of an apparatus comprising aspects of the invention, the apparatus shown in a second position.

In FIGS. 1a and 1b, an apparatus 100 is illustrated, incorporating features of the invention. In certain embodiments of the invention, the apparatus may be a portable electronic device, which may be a mobile phone, an audio player, a multimedia device, a gaming device, a navigation device, a portable computer, or another type of portable apparatus. It will be understood that aspects of the invention are applicable to any type of device in which some device parts are movable in relation to each other. In an embodiment the apparatus comprises a first part 101, and a second part 102, configured to be movable in relation to each other, the relative movement comprising translational movement. In an embodiment the apparatus may be a portable device having an overall configuration known as a slider form factor.

Figure 2:
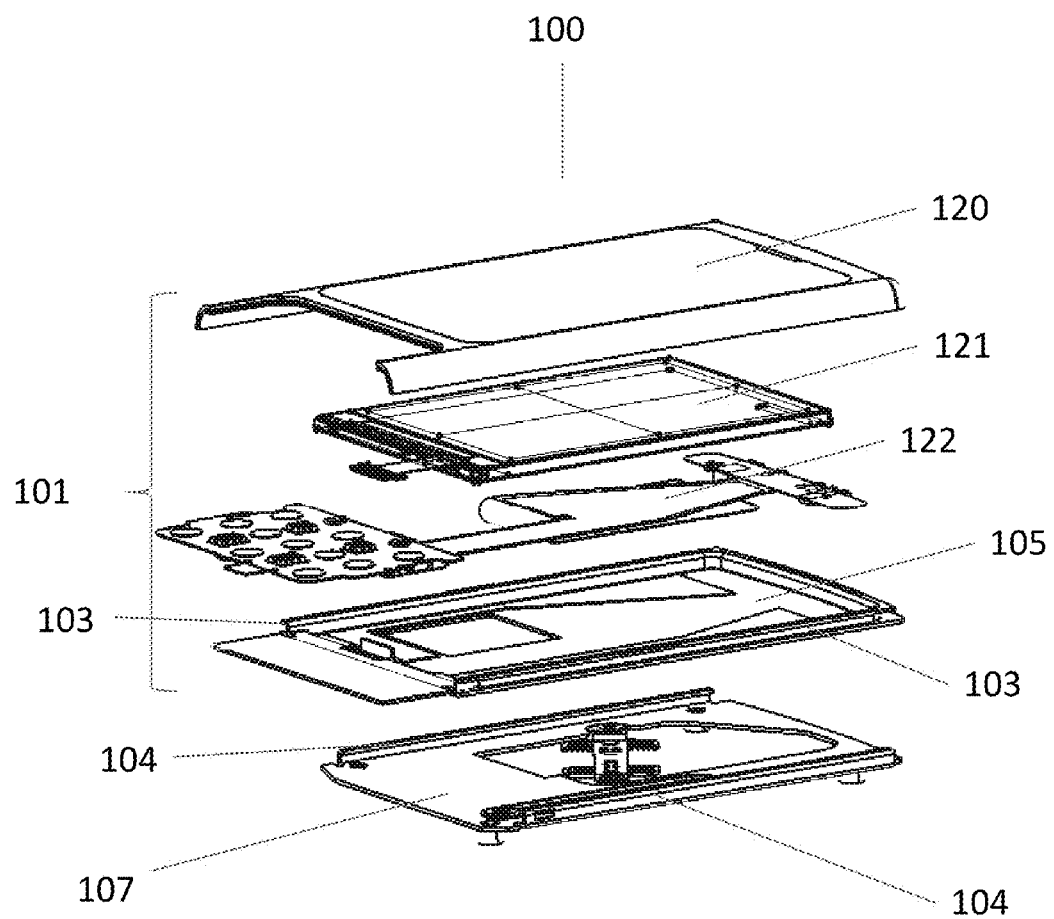
FIG. 2 is exploded view of an apparatus comprising aspects of the invention.

FIG. 2 is a partial exploded view of an apparatus featuring aspects of the invention. The drawing illustrates the first part 101, which in an embodiment comprises a display holder 105, a cover 120, a display 121, and electronic components 122. Also illustrated in the drawing is a base plate 107 comprised in the second part 102. Other parts comprised in the second part 102 are omitted for clarity. As illustrated in the drawing, the apparatus may comprise a first rail part 103 housed in the first part 101, and a second rail part 104 housed in the second part 102. In certain example embodiments the first rail part 103 is coupled to the display holder 105. However, in other embodiments the first rail part 103 may be housed in the first part 101 in any suitable way. In certain example embodiments the second rail part 104 is coupled to the base plate 107 housed in the second part 102. However, in other embodiments the second rail part 104 may be housed in the second part 102 in any suitable way. The first rail part 103 and the second rail part 104 may be configured to cooperate with each other to allow sliding movement of the first part 101 in relation to the second part 102. In certain embodiments the first rail part 103 is configured to receive the second rail part 104. In the example embodiment illustrated in FIG. 2, the apparatus 100 is provided with two first rail parts 103 and two second rail parts 104, the rail parts being generally located on opposite sides of the apparatus 101. However, it should be understood that any number and location of rails is within the scope of the invention.

Figure 3:
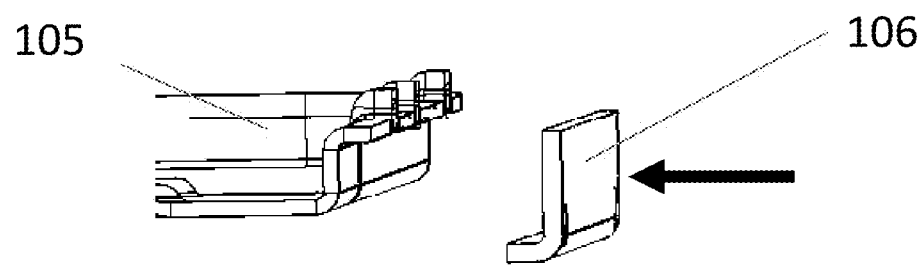
FIG. 3 illustrates how a support rail is joined with a display holder, according to embodiments of the invention.
Figure 4:
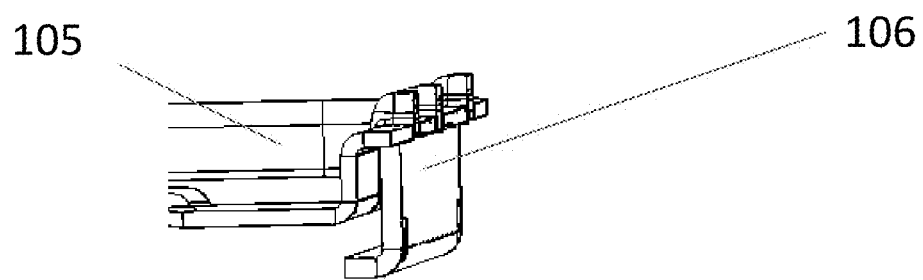
FIG. 4 illustrates how a support rail has been joined with a display holder, according to embodiments of the invention.

A method according to aspects of the invention will now be described. In certain embodiments the method may be directed to assembling a device described in FIGS. 1 and 2. However, the method should not be interpreted only in the context of FIGS. 1 and 2. In FIGS. 3 and 4, a method step is described, in which a support rail 106 is joined to the display holder 105. The drawings also illustrate the structure of an apparatus according to aspects of the invention. In FIG. 3, the support rail 106 and the display holder 105 are shown separate, and in FIG. 4 they are shown in a position after coupling them together. In certain example embodiments of the invention, joining the support rail 106 and the display holder 105 together is carried by spot welding. However, any other suitable attachment method is equally within scope of the invention.

Figure 5:
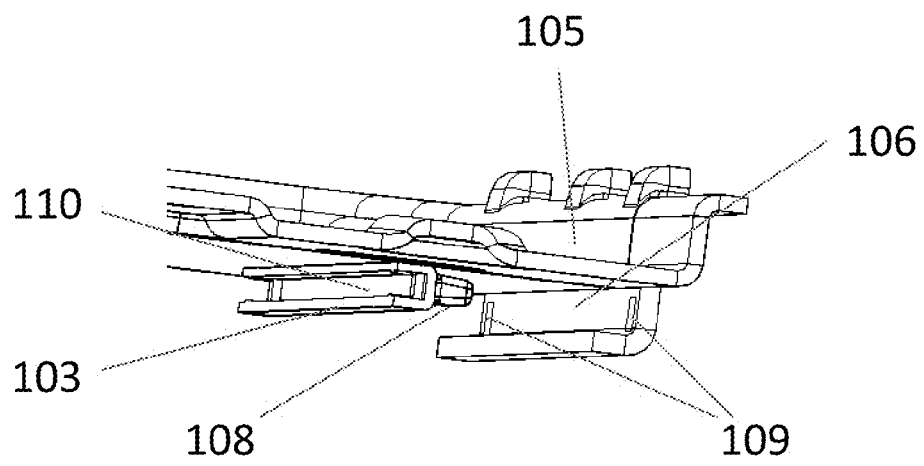
FIG. 5 illustrates how a first rail part is joined with a support rail, according to embodiments of the invention.
Figure 6:
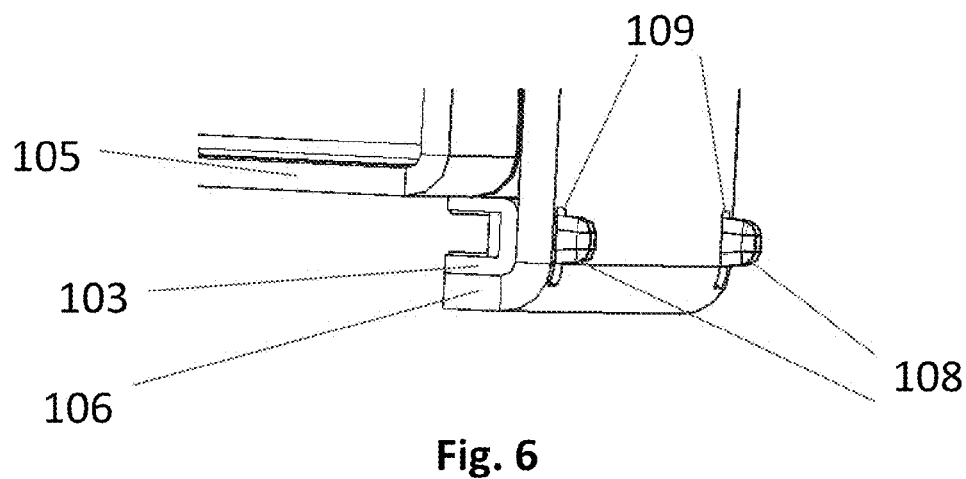
FIG. 6 illustrates how a first rail part has been joined with a support rail, according to embodiments of the invention.

FIGS. 5 and 6 illustrate a method step according to certain example embodiments, in which the first rail part 103 is coupled to the support rail 106. The drawings also illustrate the structure of an apparatus according to aspects of the invention. In some embodiments of the invention, polyoxymethylene (POM) is used as a material of the first rail part 103. However, other suitable materials are equally within scope of the invention. A suitable rail material may advantageously provide a low friction against movement of the opposing rail part, good mechanical stability and durability in use, and it should have a suitable melting point to be formed according to aspects of the invention. As will be understood from the drawings, the first rail may comprise a protrusion 108, and the support rail 106 may comprise an aperture 109, which may be configured to receive the protrusion. While reference is made to one protrusion 108 and one aperture 109, it should be understood that any number of protrusions 108 and apertures 109 is equally within the scope of the invention. In the drawings the protrusion 108 is illustrated as having a generally circular cross-section. However, any suitable shape is possible without departing from the scope of the invention. During this method step, the protrusion 108 and the aperture 109 may serve as a guidance structure to facilitate correct placement of the first rail part 103 on the support rail 106. Also shown in the drawings is a groove 110 provided in the first rail part 103. The groove 110 has a depth and a width, which are suitably selected to receive the second rail part 104.

Figure 7:
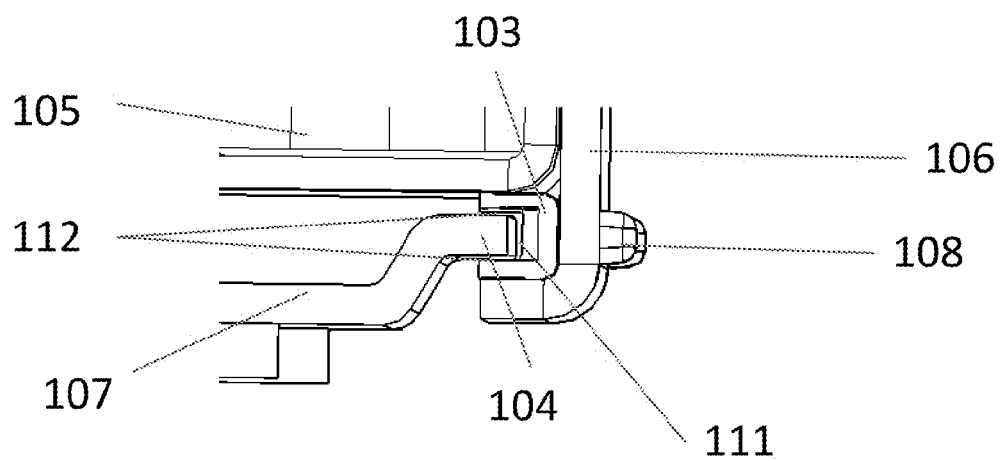
FIG. 7 illustrates how a display holder is configured to cooperate with a first rail part, according to embodiments of the invention.

FIG. 7 illustrates a method step according to certain embodiments, in which the second rail part 104 is configured to couple movably with the first rail part 103. The drawing also illustrates the structure of an apparatus according to aspects of the invention. In the example embodiment shown in the drawing, the second rail part 104 is comprised in the base plate 107, which may be formed of a metallic material. However it will be understood that any suitable material and shape may be used. The drawing illustrates a method stage where the second rail 104 part has been placed generally in contact or vicinity of the first rail part 103, in such a way that the second rail part 104 may be received in the groove 110 provided in the first rail part 103. As also seen in FIG. 7, the structure at this stage of the method may comprise gaps, clearances, or separation distances between the first rail part 103 and the second rail part 104. More specifically, a separation distance 111 may exist in direction of the depth of the groove 110, and a separation distance 112 may exist in direction of the width of the groove 110.

Figure 8:
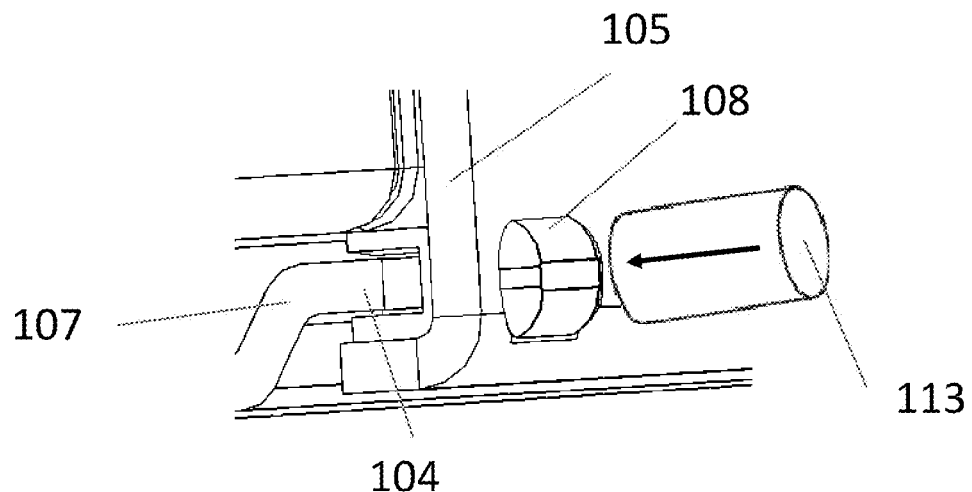
FIG. 8 illustrates how heating and pressure is applied using a heat staking tool, according to embodiments of the invention.

FIG. 8 illustrates a method step according to certain embodiments, in which energy is provided in order to cause a deformation. Provision of energy may comprise application of heat. The drawing also illustrates structure of an apparatus according to aspects of the invention. In some example embodiments, heating is applied using a heat staking tool 113. In some example embodiments, heating is applied by bringing the heat staking tool 113 in contact with the protrusion 108. However, application of heat can be carried out using any suitable equipment. For example, ultrasonic forming may be used to cause the desired deformation. It should also be understood that heat can be applied to any location without departure from the scope of the invention. During or immediately following the heating stage, the heat staking tool 113 may also be used to apply pressure to the at least partially molten rail material, in order to control the deformation of the first rail part 103. Application of pressure may cause the at least partially molten rail material to assume a new shape, in which the separation distances 111 and 112 between the first rail part 103 and the second rail part 104 are reduced compared with its dimensions before the heating stage.

Figure 9:
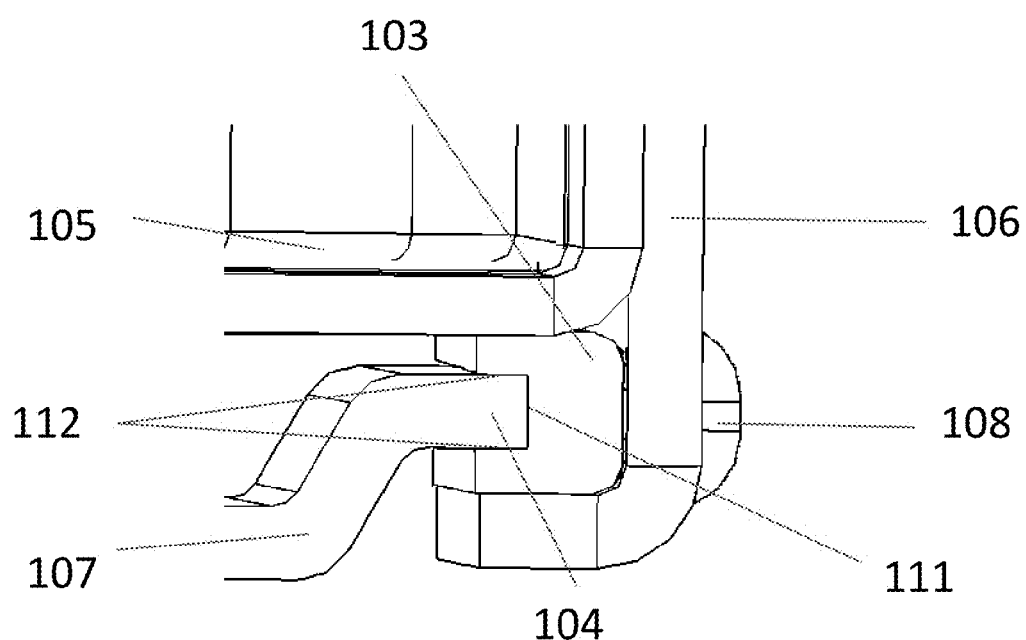
FIG. 9 illustrates an apparatus comprising aspects of the invention after completion of the assembly.

In certain example embodiments, heating and pressure applied to the first rail part 103 causes a thermal deformation of the first rail part 103. The thermal deformation may be at least partial melting of first rail part, which allows the material of the first rail part 103 to take a shape which is generally at least partly different compared with its shape before application of heating. In some embodiments the heating may also cause other type of changes, such as thermal expansion or contraction, non-volumetric deformation, or a combination of different changes. After application of heat is finished, the material of the first rail part 103 returns to a solid state. Structure of an apparatus according to certain embodiments after application of heat is illustrated in FIG. 9. As will be understood from the drawing, the thermal deformation caused by application of heating may have resulted in diminishing of the separation distances 111 and 112 in comparison with their dimensions before the application of heating. After the material of the first rail part 103 has returned to a solid state, some surfaces of the first rail part 103 and corresponding surfaces of the second rail part 104 may be to some degree stuck to each other as a result of the solidifying of the material of the first rail part 103 in contact with the second rail part 104. However, application of a sufficient mechanical force to move the first rail part 103 and the second rail part 104 slidingly in relation to each other may cause the first rail part 103 and the second rail part 104 to become substantially unstuck so that they can be moved in relation to each other with low friction. A few back and forth movements of the first rail part 103 and the second rail part 104 in relation to each other should be sufficient to cause them to become substantially unstuck.

In an embodiment of the invention, the first rail part 103 may be provided with protrusions 108 configured to be received in apertures 109 provided in the support rail 106. However, in another embodiment, the structure may not be provided with support rails, and the first rail part 103 may not be provided with protrusions 108. Instead, the first rail parts 103 may be received in suitably formed recesses or other support structures in the display holder 105, which may be provided with apertures for application of heating to the first rail part 103.

In some example embodiments of the invention, a deformation is caused in the first rail part 103, and the second rail part 104 remain substantially unchanged when a method according to embodiments of the invention is carried out. However, it is also possible that a deformation is caused in the second rail part 104, and the first rail part 103 remain substantially unchanged. It is also possible that both rail parts undergo changes when a method according to embodiments of the invention is carried out. It is also possible that any characteristics previously recited for the first rail part 103 are applied to the second rail part, and any characteristics previously recited for the second rail part 104 are applied to the first rail part 103.

Figure 10:
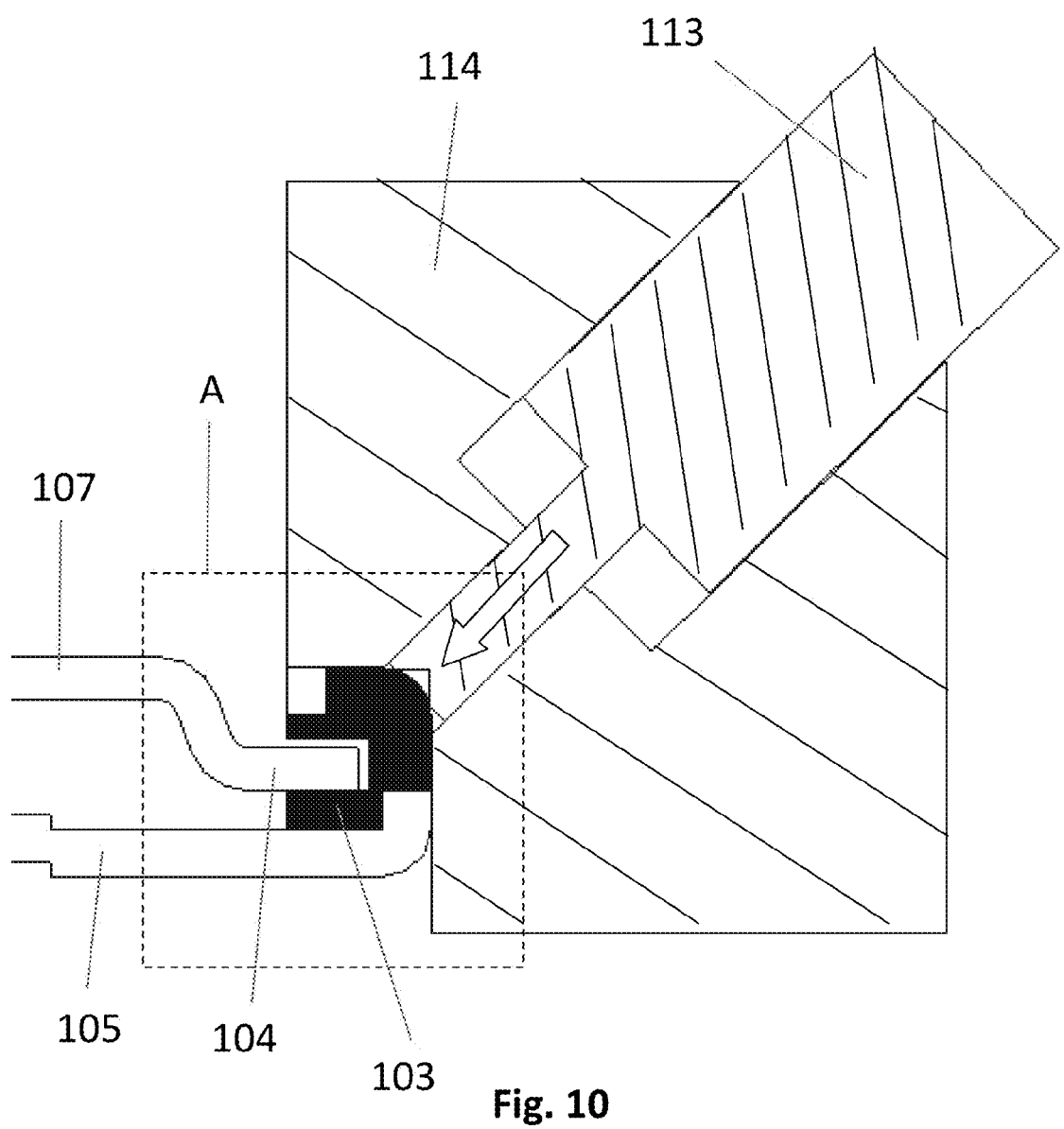
FIG. 10 illustrates a method according to embodiments of the invention before application of heat and pressure.
Figure 11:
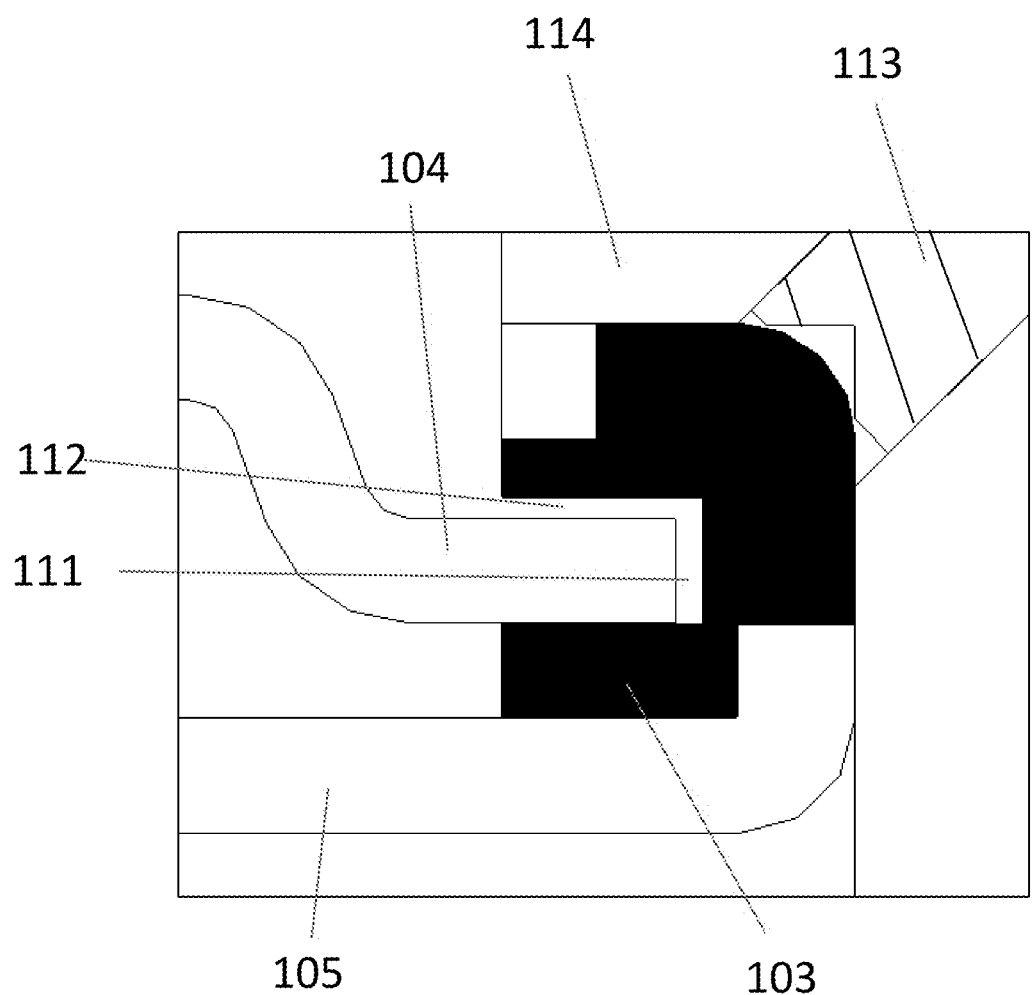
FIG. 11 is an enlarged view of details in FIG. 10.
Figure 12:
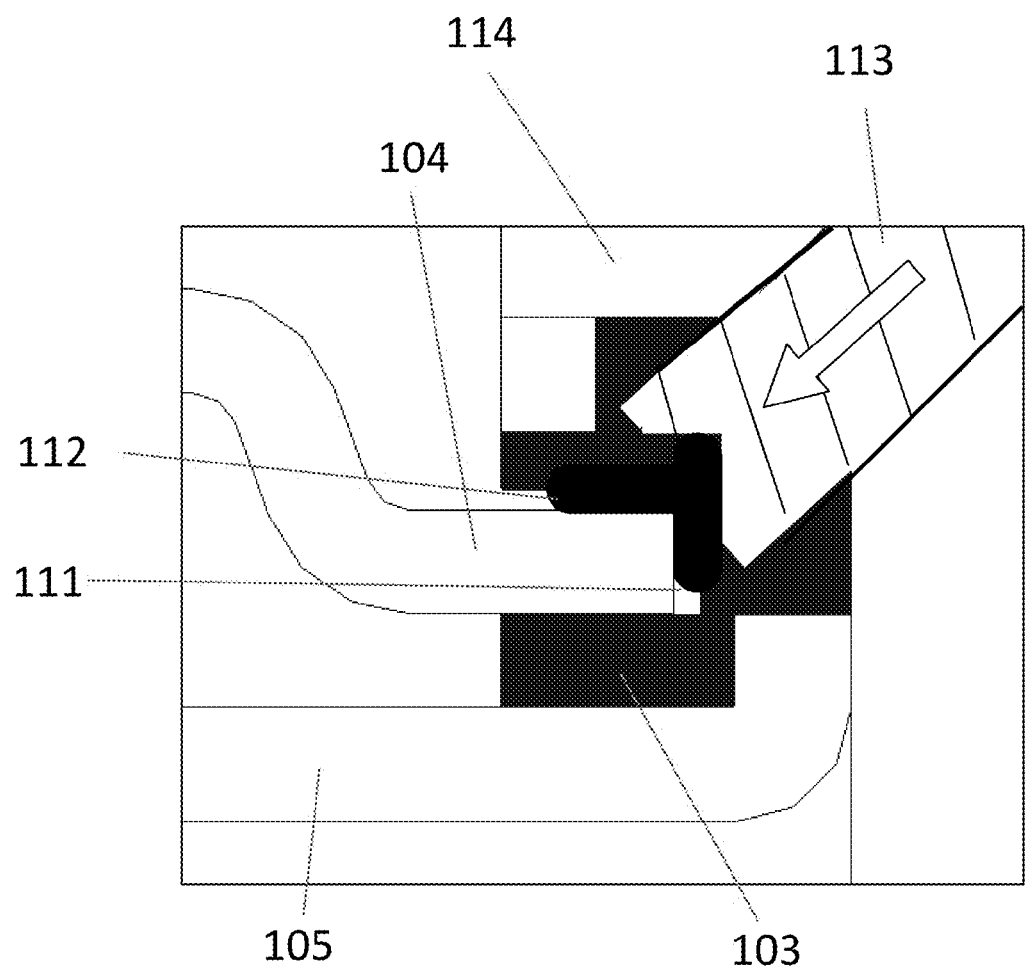
FIG. 12 illustrates a method according to embodiments of the invention during or after application of heat and pressure.

In an embodiment of the invention, a relatively small area of the first rail part 103 is exposed for the heat staking tool 113 in the heating stage of the method. However, in another example embodiment, the exposed area is larger than the contact area of the heat staking tool 113 or other heating tool. An example embodiment is illustrated in FIGS. 10, 11, and 12. In this embodiment, the heat staking tool 113 may be provided with a protective structure 114 configured to limit protrusion of molten rail material away from the rail structure. FIG. 10 illustrates a method step before application of heat and pressure on the first rail part 103, and an enlarged view of area A is shown in FIG. 11. In the state shown in FIGS. 11, clearances 111 and 112 may exist betweem the first rail part 103 and the second rail part 104. FIG. 12 illustrates a method step during application of heat and pressure, and the resulting structure after application of heat and pressure. As illustrated in the drawing, the first rail part 103 undergoes a thermal deformation, which may comprise at least partial melting of material of the said rail part. As a result, the first rail part 103 assumes a new shape in which the clearances 111 and 112 have been reduced. As also seen in FIG. 12, the protective structure 114 limits protrusion of molten material to unwanted directions.

Figure 13:
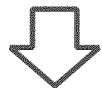
FIG. 13 is a flowchart which illustrates a method according to an embodiment of the invention.
Figure 13:
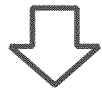

FIG. 13 is a flowchart which illustrates a method according to aspects of the invention. The method may comprise: coupling a first rail part with a second rail part; deforming at least one of the first rail part and the second rail part for reducing a separation distance between the first rail part and the second rail part; and configuring the first rail part and the second rail part for relative movement. It should be understood that many variations of the method are possible within the scope of the invention.

In embodiments of the invention, the deformation of the first rail part 103 is achieved by causing the existing rail material to assume a new shape as a consequence of application of heat. However, it is also possible that new material is added to the rail structure at the heating stage.

Example embodiments of the invention have been described as relating to a linear slider module. However, aspects of the invention are also applicable to assemblies involving rotable movement. As an example, aspects of the invention may be utilized to reduce gaps in a hinge mechanism of a swiveling mobile device.

Without in any way limiting the scope, interpretation, or application of the claims appearing below, a technical effect of one or more of the example embodiments disclosed herein is to diminish a separation distance between a first rail part and a second rail part, the first rail part having a groove in which the second rail part couples movably, the diminishing of separation distance occurring in depth direction of the groove. Another technical effect of one or more of the example embodiments disclosed herein is to diminish a separation distance between a first rail part and a second rail part, the first rail part having a groove in which the second rail part couples movably, the diminishing of separation distance occurring in width direction of the groove. Another technical effect of one or more of the example embodiments disclosed herein is to provide a slide module having a first rail part and a second rail part, the first rail part and the second rail part having a diminished separation distance between each other. Another technical effect of one or more of the example embodiments disclosed herein is to provide a slide module having a first rail part and a second rail part, the first rail part having a groove in which the second rail part couples movably, the separation distance being diminished in depth direction of the groove. Another technical effect of one or more of the example embodiments disclosed herein is to provide a slide module having a first rail part and a second rail part, the first rail part having a groove in which the second rail part couples movably, the separation distance being diminished in width direction of the groove. Another technical effect of one or more of the example embodiments disclosed herein is to improve manufacturing yield of sliding assemblies.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method for providing a slide arrangement, comprising:
    coupling a first rail part with a second rail part;
    inelastically deforming at least one of the first rail part and the second rail part;
    reducing a separation distance between the first rail part and the second rail part in response to inelastically deforming at least one of the first rail part and the second rail part; and
    configuring the first rail part and the second rail part for relative movement.

2. A method as in claim 1, wherein the deformation comprises at least partial melting of at least one of the first rail part or the second rail part.

3. A method as in claim 2, wherein the at least partial melting is caused in the first rail part.

4. A method as in claim 1, wherein the first rail part comprises a plastic material.

5. A method as in claim 1, wherein the first rail part is coupled to a support rail.

6. A method as in claim 5, the first rail part being provided with protruding parts, wherein the protruding parts are configured to couple with apertures provided in the support rail.

7. A method as in claim 6, wherein heating is applied to the protruding parts.

8. A method as in claim 1, wherein the first rail part is provided with a groove configured to receive the second rail part.

9. A method as in claim 8, the groove having a depth and a width, wherein the deformation is configured to reduce a separation distance between the first rail part and the second rail part.

10. A method as in claim 1, wherein the second rail part comprises metal.

11. A method as in claim 1, wherein a heat staking tool is used to provide energy for the deformation.

12. A method as in claim 11, wherein a protective structure associated with the heat staking tool is configured to control protrusion of material.

13. A method as in claim 1, wherein pressure is applied to the first rail part.

14. A method as in claim 1, wherein the slide arrangement is provided for a portable device.

* * * * *